(12) United States Patent
Saito et al.

(10) Patent No.: US 10,802,471 B2
(45) Date of Patent: Oct. 13, 2020

(54) DEVICE, METHOD, AND PROGRAM FOR CONTROLLING AGRICULTURAL MACHINE

(71) Applicant: TOPCON CORPORATION, Itabashi-ku, Tokyo (JP)

(72) Inventors: Noriko Saito, Tokyo (JP); Sora Otaguro, Tokyo (JP); Ryosuke Tomizawa, Tokyo (JP); Atsushi Ohyama, Tokyo (JP); Tsuyoshi Yoshida, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 0 days.

(21) Appl. No.: 16/120,506

(22) Filed: Sep. 4, 2018

(65) Prior Publication Data
US 2019/0072937 A1   Mar. 7, 2019

(30) Foreign Application Priority Data

Sep. 6, 2017   (JP) .................................. 2017-171287

(51) Int. Cl.
| | | |
|---|---|---|
| G05B 19/416 | (2006.01) | |
| A01C 21/00 | (2006.01) | |
| A01C 15/00 | (2006.01) | |
| G05D 1/02 | (2020.01) | |
| B64D 1/16 | (2006.01) | |
| A01B 69/04 | (2006.01) | |

(52) U.S. Cl.
CPC ............ *G05B 19/416* (2013.01); *A01C 15/00* (2013.01); *A01C 21/005* (2013.01); *G05D 1/0223* (2013.01); *G05D 1/0278* (2013.01); *A01B 69/008* (2013.01); *B64C 2201/141* (2013.01); *B64D 1/16* (2013.01); *G05B 2219/45017* (2013.01); *G05D 2201/0201* (2013.01)

(58) Field of Classification Search
CPC ........ G05B 19/416; G05B 2219/45017; G05D 1/0223; G05D 1/0278; G05D 2201/0201; A01C 15/00; A01C 21/005; B64C 2201/141; A01B 69/008; B64D 1/16
See application file for complete search history.

(56) References Cited

U.S. PATENT DOCUMENTS 5,220,876 A * 6/1993 Monson ............... A01B 79/005
                                                           111/130

FOREIGN PATENT DOCUMENTS

JP         2016-220596 A      12/2016

\* cited by examiner

*Primary Examiner* — Carlos R Ortiz Rodriguez
(74) *Attorney, Agent, or Firm* — Chiesa Shahinian & Giantomasi PC (57) ABSTRACT

A technique is provided to enable low-cost control of amounts of fertilizer applied. A control device controls a currently used agricultural machine that applies fertilizer to a crop while traveling through a field. The control device includes a growth data receiving unit, a fertilizer application amount value calculator, and a speed signal generator. The growth data receiving unit receives growth data that is obtained by sensing a growth condition of a crop at each location in the field. The fertilizer application amount value calculator determines an amount of fertilizer on the basis of the growth data. The speed signal generator generates a speed signal to cause the agricultural machine to travel at a speed corresponding to a variable value of an amount of the fertilizer to be applied at each location in the field.

8 Claims, 8 Drawing Sheets

DEVICE, METHOD, AND PROGRAM FOR CONTROLLING AGRICULTURAL MACHINE

CROSS-REFERENCE TO RELATED APPLICATIONS

This application is based upon and claims benefit of priority from Japanese Patent Application No. 2017-171287, filed Sep. 6, 2017, the entire contents of which are incorporated herein by reference.

BACKGROUND OF THE INVENTION

The present invention relates to a technique for applying fertilizer using a fertilizer distributing device.

Japanese Unexamined Patent Application Laid-Open No. 2016-220596 discloses a seedling transplanting machine that applies fertilizer. This machine includes a traveling vehicle having right and left traveling wheels, a fertilizer distributing device joined to a rear of the traveling vehicle, a field information measuring member that measures field information, and a control device that determines an amount of fertilizer to be applied by the fertilizer distributing device on the basis of measurement values measured by the field information measuring member. The control device corrects the measurement value, which is measured by the field information measuring member, corresponding to the traveling speed of the traveling vehicle, and the control device determines the amount of the fertilizer application on the basis of the corrected measurement value.

SUMMARY OF THE INVENTION

The amount of fertilizer to be applied on a ground surface by distribution from a fertilizer distributing device can be adjusted by varying an amount of fertilizer to be discharged from the fertilizer distributing device. However, the amount of fertilizer to be discharged cannot be varied in many of fertilizer distributing devices, and a fertilizer distributing device is generally expensive, and it therefore may be difficult to replace with a new one. In view of these circumstances, an object of the present invention is to provide a technique that enables low-cost control of the amount of fertilizer that is applied.

A first aspect of the present invention provides an agricultural machine control device for controlling a mobile body configured to apply fertilizer to a crop while traveling through a field. The device includes a speed signal generator that generates a speed signal to cause the mobile body to travel at a speed corresponding to a variable value of the amount of fertilizer to be applied.

According to a second aspect of the present invention, in the first aspect of the present invention, the speed signal generator may set a relatively high speed for a location at which the growth condition of the crop is relatively superior, and may set a relatively low speed for a location at which the growth condition of the crop is relatively inferior.

According to a third aspect of the present invention, in the first or the second aspect of the present invention, the agricultural machine control device may further include a growth data receiving unit, a growth map generator, a fertilizing map generator, and a speed map generator. The growth data receiving unit receives growth data of a crop at each location in the field. The growth map generator generates a growth map showing a growth condition of the crop at each location in the field, on the basis of growth data. The fertilizing map generator generates a fertilizing map specifying an amount of fertilizer application at each location in the field, on the basis of the growth map. The speed map generator generates a speed map specifying a speed with respect to each location in the field, on the basis of the fertilizing map.

According to a fourth aspect of the present invention, in the third aspect of the present invention, the growth map or the fertilizing map may be obtained in advance.

According to a fifth aspect of the present invention, in any one of the first to the fourth aspects of the present invention, the agricultural machine control device may further include a mobile body route receiving unit that receives a preliminarily set route. The mobile body applies the fertilizer while automatically traveling along the preliminarily set route.

According to a sixth aspect of the present invention, in any one of the first to the fifth aspects of the present invention, the agricultural machine control device may further include a variable fertilizing-result storage that stores a fertilizing result obtained from the amount of the fertilizer application and the speed of the mobile body.

A seventh aspect of the present invention provides an agricultural machine control method for controlling a mobile body configured to apply fertilizer to a crop while traveling through a field. The method includes controlling a speed to cause the mobile body to travel at a speed corresponding to a variable value of an amount of the fertilizer to be applied.

An eighth aspect of the present invention provides a non-transitory computer recording medium storing computer executable instructions for controlling a mobile body that is configured to apply fertilizer to a crop while traveling through a field. The computer executable instructions, when executed by a computer processor, causes the computer processor to function as a speed signal generator that generates a speed signal to cause the mobile body to travel at a speed corresponding to a variable value of amount of fertilizer to be applied.

The present invention provides a technique that enables low-cost control of the amount of fertilizer applied. The present invention provides a device that enables application of fertilizer in an amount corresponding to a growth condition of a crop in a field, and the device can later be mounted, for example, on a fertilizer distributing device of a user.

DESCRIPTION OF THE EMBODIMENTS

Base Conditions

In this embodiment, in order to achieve uniform growth of plants or farm produce grown in a sectioned area of a farmland, necessary amounts of fertilizer application are calculated in consideration of current growth conditions of the plants or the farm produce, and a traveling speed of a fertilizer distributing device is controlled so that the necessary amount of fertilizer will be distributed. Hereinafter, the sectioned area of the farmland is represented as a "field", and plants and farm produce are collectively called "crops". The amount of fertilizer application is concentration of fertilizer to be distributed per unit area of the field: granulated fertilizer may be expressed in $g/m^2$ or $g/cm^2$, liquid fertilizer may be expressed in $l/m^2$ or $cc/cm^2$, and pelleted fertilizer may be expressed in number of pellets/$m^2$ or number of pellets/$cm^2$.

A mobile body for applying fertilizer may be a motorized body that travels by its own power or may be a trailer that travels by being towed by a tractor or other vehicle. In this embodiment, a fertilizer distributing device that is towed by a tractor is exemplified as the mobile body for applying fertilizer. However, the mobile body for applying fertilizer can also use a tractor, a helicopter, or an unmanned aerial vehicle (UAV), each of which is equipped with a device for applying fertilizer.

The mobile body of a type that travels on a ground is equipped with an automatic steering device, an automatic speed controller, a location identifying device using a global navigation satellite system (GNSS), which is called a "GPS receiver", an automatic traveling system having a speed measuring device, and a growth condition sensor. This mobile body can apply fertilizer along a predetermined route.

The mobile body of a type that flies through the air is equipped with a location identifying device or a GPS receiver, an automatic pilot, an automatic speed controller, a speed measuring device, and a growth condition sensor. This mobile body can fly and apply fertilizer along a predetermined route.

Outline

Figure 1:
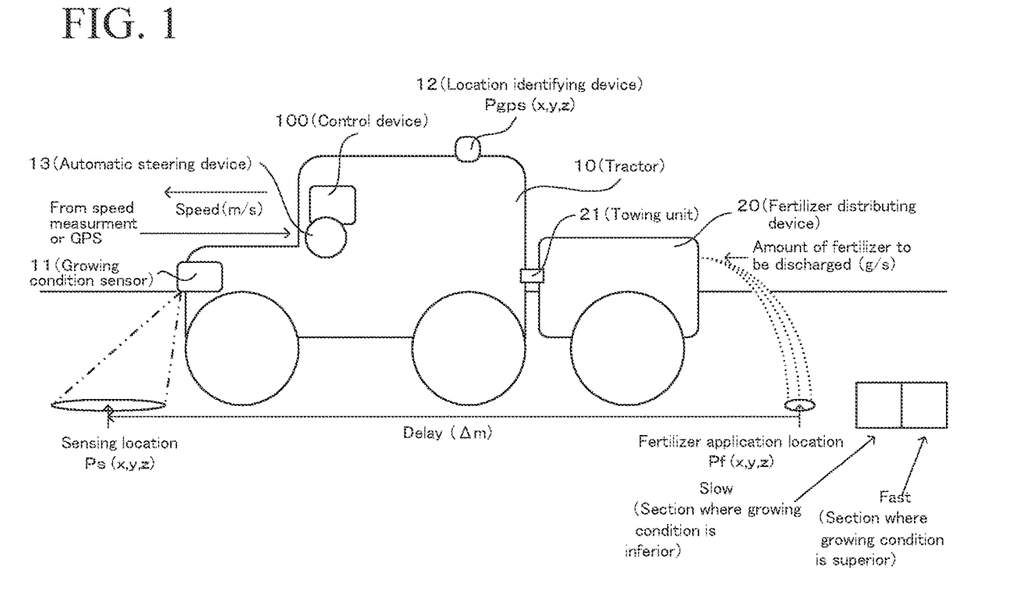
FIG. 1 is a conceptual diagram of an embodiment.

FIG. 1 conceptually shows a situation in which, while a tractor is made to automatically travel, a growth condition of a crop growing in a field is obtained as growth data by a growth condition sensor, and in the meantime, location data of the corresponding crop is obtained by using a GNSS, to apply fertilizer by adjusting the traveling speed of the tractor on the basis of the growth data and the location data.

The example in FIG. 1 uses a tractor 10 that tows a fertilizer distributing device 20. The tractor 10 includes a growth condition sensor 11, a location identifying device 12 using a GNSS, an automatic steering device 13 functioning as both an automatic steering device and an automatic speed controller, and a control device 100. The fertilizer distributing device 20 distributes fertilizer onto the field. In this example, the fertilizer distributing device 20 is towed with a towing unit 21 of the tractor 10 and travels through the field.

The fertilizer distributing device 20 need not necessarily be a newly developed device and can be a currently used device. The amount of fertilizer to be discharged per unit time by the fertilizer distributing device 20 is constant, and the fertilizer is distributed onto a ground surface while the fertilizer distributing device 20 travels by being towed by the tractor 10. In this case, the constant amount of fertilizer to be discharged cannot be varied in real time, and the amount of the fertilizer to be discharged cannot be varied during distribution of the fertilizer, but the set value of the amount of the fertilizer to be discharged can be varied.

The form of the fertilizer is not particularly limited, and for example, granulated fertilizer, pelleted fertilizer, or liquid fertilizer can be used. The liquid fertilizer may be used by spraying. In addition, the fertilizer distributing device may employ a structure that plows the soil and then distributes fertilizer thereto. Alternatively, an apparatus having the tractor 10 and the fertilizer distributing device 20 integrated together may also be used.

The growth condition sensor 11 performs image analysis to measure the growth condition of a target crop. In this example, light of a predetermined wavelength is emitted from a light source (not shown) to a target crop, and light reflected thereat is received. Then, color data of this reflected light is obtained, and growth data of the target crop is obtained from the color data. For example, the target crop may be spinach. In this case, light of a predetermined wavelength range is emitted onto the spinach, the light reflected by the spinach is measured, and a wavelength spectrum near the green wavelength is obtained from the measured data of the reflected light. A relationship between the wavelength spectrum and the growth condition of the spinach is obtained as reference data in advance. The obtained data of the wavelength spectrum is compared with the preliminarily obtained reference data, whereby growth data of the spinach at a sensing location Ps (x, y, z) is obtained. The growth data is represented by N-step evaluation of the growth condition. The symbol "N" is any integer of 2 or greater.

The growth condition sensor 11 can also perform image analysis to evaluate the size of a target crop, such as the size of stems, leaves, or fruits, or to evaluate the density of leaves or fruits. In one example, the growth condition sensor 11 may employ a structure that obtains a spectral image of a target crop by using a multispectral camera or by other means to obtain the growth condition of the target crop from the spectral image.

The location identifying device 12 identifies its own three-dimensional location by using a GNSS. The distance relationships between the location identifying device 12, the growth condition sensor 11, the position of a distribution port for fertilizer of the fertilizer distributing device 20, and a distance in which the fertilizer discharged from the distribution port reaches the soil in the field, are preliminarily known. Thus, the positioning performed by the location identifying device 12 also determines a sensing location Ps(x, y, z) and a fertilizer application location Pf(x, y, z) at the same time.

The automatic steering device 13 uses the positioning data obtained by the location identifying device 12, to steer the tractor 10 in accordance with a predetermined route. Moreover, the automatic steering device 13 controls the speed of the tractor 10 in response to a speed signal output from the control device 100. The control device 100 performs a process to control the speed of the tractor 10 corresponding to the growth condition of the crop in the field. The details of the control device 100 are described later.

Figure 2:
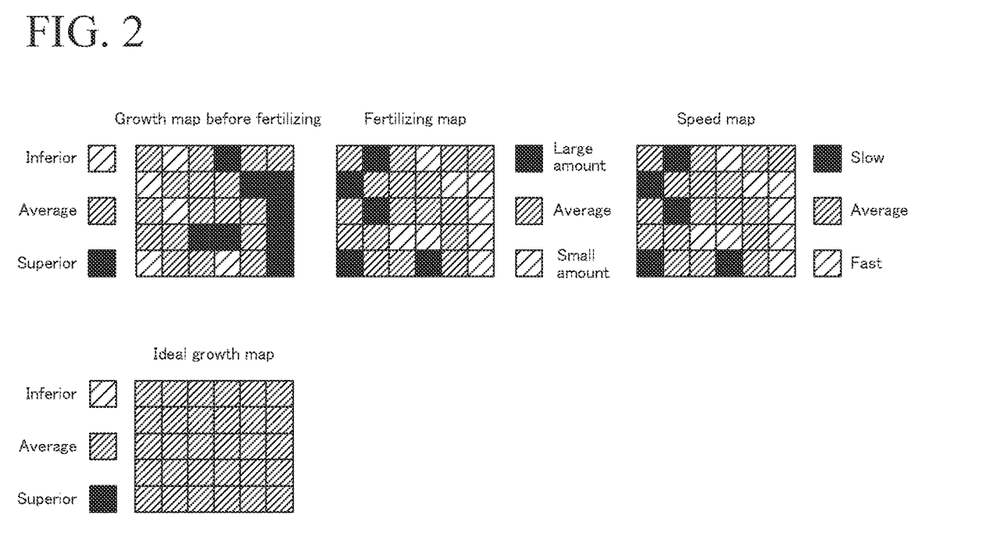
FIG. 2 is a conceptual diagram showing relationships among a growth map, a fertilizing map, and a speed map.

FIG. 2 shows an image diagram showing correspondence relationships between a growth map, a fertilizing map, and a speed map. The growth map shows growth conditions of crops in a field and is represented by the growth data and the location data. The fertilizing map shows amounts of fertilizer application necessary for the crops to grow uniformly in the field. The speed map shows traveling speeds of the fertilizer distributing device required to apply fertilizer in accordance with the fertilizing map under the condition that the amount of the fertilizer to be discharged from the fertilizer distributing device is constant at each location in the field. A location at which the growth condition is inferior requires a greater amount of fertilizer application, which causes the fertilizer distributing device to travel at a lower speed. In contrast, a location at which the growth condition is superior requires a smaller amount of fertilizer application, which causes the fertilizer distributing device to travel at a higher speed.

Figure 3:
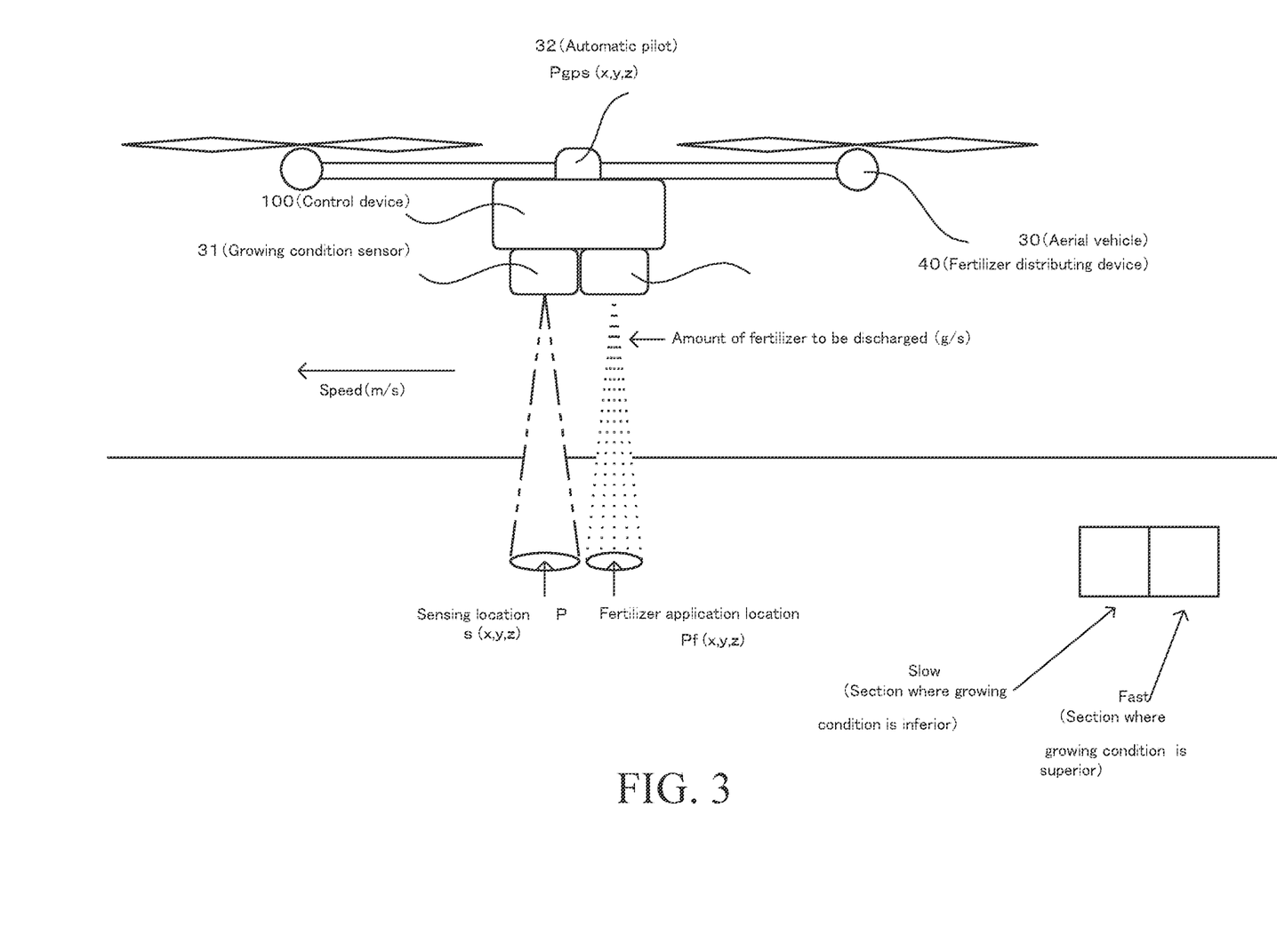
FIG. 3 is a conceptual diagram of an embodiment.

FIG. 3 conceptually shows a situation in which fertilizing is conducted by using an aerial vehicle 30 in a field. The aerial vehicle 30 includes a growth condition sensor 31, a location identifying device using a GNSS, an automatic pilot 32 serving as an automatic speed controller and a speed measuring device, a fertilizer distributing device 40, and a control device 100. In this case, also, the fertilizing is performed by processing similar to the processing in the case of using the tractor as described above.

1. First Embodiment

Configuration

Figure 4:
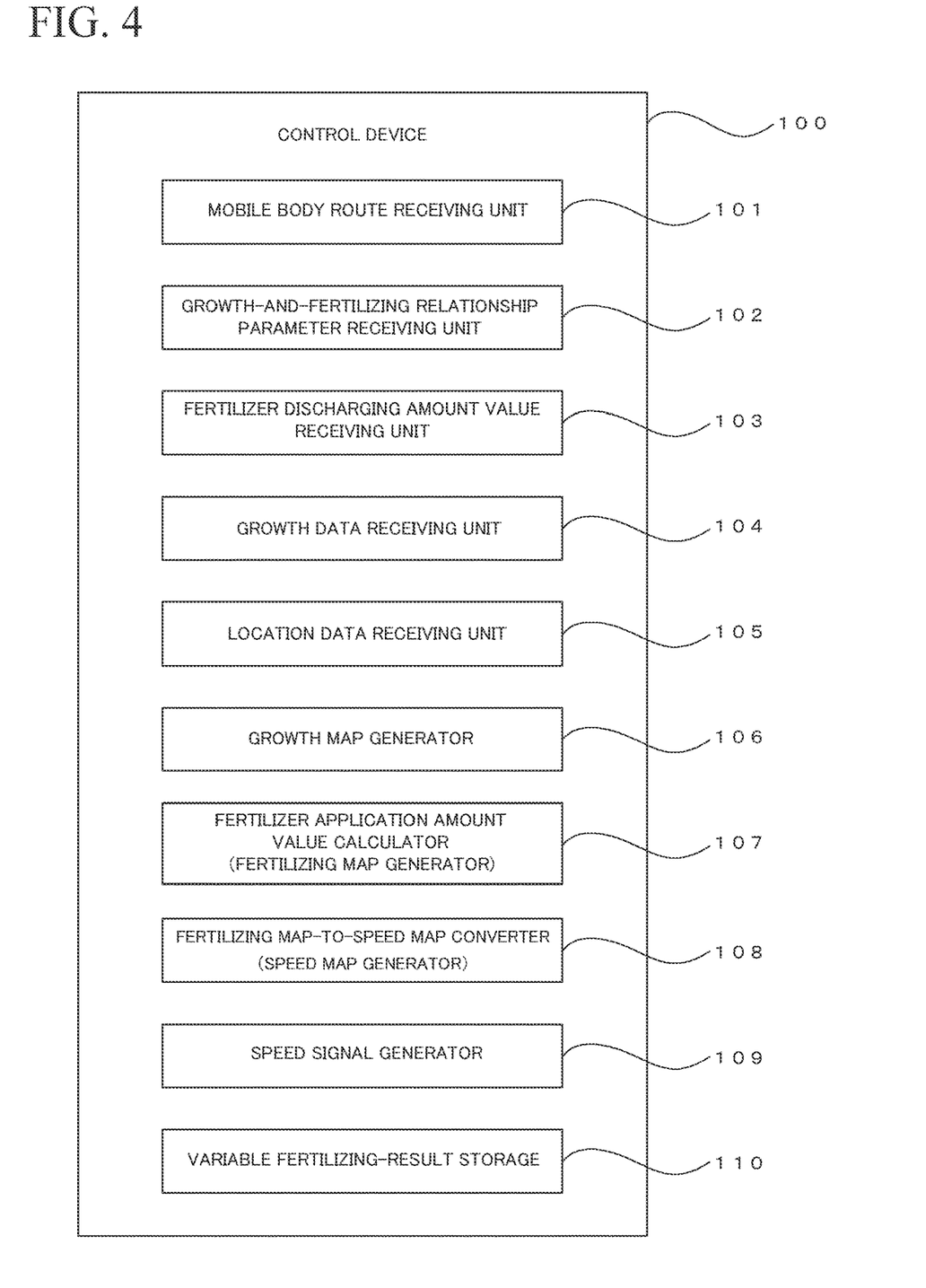
FIG. 4 is a block diagram of a control device.

FIG. 4 shows the control device 100 using the present invention. The control device 100 is mounted on the tractor 10 and generates a control signal or a speed signal for controlling the speed of the tractor 10. The control device 100 is a piece of hardware that functions as a computer and includes a central processing unit (CPU), a memory, various kinds of interfaces, and other necessary electronic circuits. The control device 100 can be viewed as a piece of hardware having each functional unit shown in FIG. 4. One or more of the functional units shown in FIG. 4 may be constructed of software or may be constructed of dedicated hardware. Programs for executing the functions of the control device 100 are stored in the memory of the control device 100. Alternatively, or additionally, the programs may be stored in an external storage medium and may be provided therefrom. These basic features are the same as those of a control device 200 in FIG. 7.

The control device 100 includes a mobile body route receiving unit 101, a growth-and-fertilizing relationship parameter receiving unit 102, a fertilizer discharging amount value receiving unit 103, a growth data receiving unit 104, a location data receiving unit 105, a growth map generator 106, a fertilizer application amount value calculator 107, a fertilizing map-to-speed map converter 108, a speed signal generator 109, and a variable fertilizing-result storage 110.

The mobile body route receiving unit 101 receives a planned route along which the mobile body employing the tractor 10 travels to apply fertilizer. The reception of the planned traveling route enables automatic steering of the mobile body. The traveling route is preliminarily set on map data, and the set traveling route is received by the mobile body route receiving unit 101. These functions also apply to a mobile body route receiving unit 201.

The growth-and-fertilizing relationship parameter receiving unit 102 receives data of the necessary amount of fertilizer application in consideration of the growth condition of a crop in a field. This data shows relationships among variety of crop to be grown, a growth period such as a season, a growth condition, kind of fertilizer, and other parameters.

The fertilizer discharging amount value receiving unit 103 receives data of an amount of the fertilizer to be discharged from the fertilizer distributing device 20 per unit time. The amount of fertilizer to be discharged from the fertilizer distributing device 20 per unit time is constant and is unvaried during distribution of the fertilizer. These functions also apply to a fertilizer discharging amount value receiving unit 202.

The growth data receiving unit 104 receives a growth condition of the crop in the traveling route, which is received by the mobile body route receiving unit 101. The growth data is obtained by the growth condition sensor 11 and is received by the growth data receiving unit 104. The growth data is represented by N-step evaluation of the growth condition. The symbol "N" is any integer of 2 or greater.

The location data receiving unit 105 receives data of location identified by the location identifying device 12. The position relationships between the location identifying device 12, a sensing location Ps(x, y, z) sensed by the growth condition sensor 11, and a fertilizer application location Pf(x, y, z) on a ground surface of the field at which the fertilizer is distributed from the fertilizer distributing device 20, are preliminarily known. Thus, the locations Ps(x, y, z) and Pf(x, y, z) at the time the location identifying device 12 performs positioning, are also determined from the location data that is identified by the location identifying device 12. Moreover, the future locations for Ps(x, y, z) and Pf(x, y, z) are also determined from speed information of the tractor 10. These functions also apply to a location data receiving unit 203.

The growth map generator 106 generates a growth map on the basis of the growth data and the data of the location at which the growth data is obtained. The growth map provides data of the growth condition of a crop in each location in the field in the form of a map.

The fertilizer application amount value calculator 107 functions as a fertilizing map generator. The fertilizing map is a map of the amount of the fertilizer application at each location in the field. The fertilizer application amount value calculator 107 calculates a target amount of fertilizer application at a freely selected location in the field, from the data of the necessary amount of the fertilizer application, in consideration of the growth data at the freely selected location. The data of the necessary amount of fertilizer application is received by the growth-and-fertilizing relationship parameter receiving unit 102. The growth data at the freely selected location is received by the growth data receiving unit 104. This calculation is performed at every location to be fertilized in the field and thus provides a target amount of the fertilizer application at each location, which constitutes the fertilizing map. The fertilizing map has a basic unit in terms of, for example, a sectioned area of 0.5×0.5 meters, 1×1 meter, or 1×2 meters.

The fertilizing map-to-speed map converter 108 functions as a speed map generator. The speed map is map data specifying the speed of the tractor 10 at the each location in the field. The fertilizing map-to-speed map converter 108 calculates a traveling speed of the tractor 10 or of the fertilizer distributing device 20, which is necessary for applying the target amount of the fertilizer at the freely selected location. The target amount of the fertilizer application is calculated by the fertilizer application amount value calculator 107. This calculation is performed at each location to be fertilized in the field and thus provides a traveling speed of the mobile body at each location. This information of the traveling speed of the mobile body at each location constitutes the speed map. The speed map corresponding to the necessary amount of the fertilizer application is generated by using the following relationship. That is, the amount of the fertilizer application per unit area decreases with increase in the traveling speed, and in contrast, the amount of the fertilizer application per unit area increases with decrease in the traveling speed, because the amount of the fertilizer to be discharged from the fertilizer distributing device 20 per unit time is fixed and is constant.

The speed signal generator 109 generates a speed signal for causing the tractor 10 to travel at an appropriate speed, at each of the freely selected locations, on the basis of the speed map obtained by the fertilizing map-to-speed map converter 108. The speed signal is transmitted to the automatic steering device 13 of the tractor 10, and in response to this, the automatic steering device 13 steers the tractor 10 to cause the tractor 10 to travel at the speed based on the speed map. These functions also apply to a speed signal generator 205.

The variable fertilizing-result storage 110 calculates, at the time of fertilizing at the freely selected location in the field, an amount of fertilizer distributed, to each of the freely selected locations in the field, from the traveling speed of the tractor 10 and the amount of the fertilizer discharged from the tractor 10 per unit time. Then, the variable fertilizing-result storage 110 stores this calculation result as a variable fertilizing result. This record is performed with respect to each of the freely selected locations in the target field, whereby a map is generated. That is, data of the amount of the fertilizer distribution correlated with the location in the field is obtained by using the variable fertilizing results. These functions also apply to a variable fertilizing-result storage 206.

Example of Processing

The following describes an example of the processing performed by the control device 100. The control device 100 is mounted on the tractor 10 that serves as a fertilizing vehicle and is embodied as in the case in FIG. 1.

Figure 5:
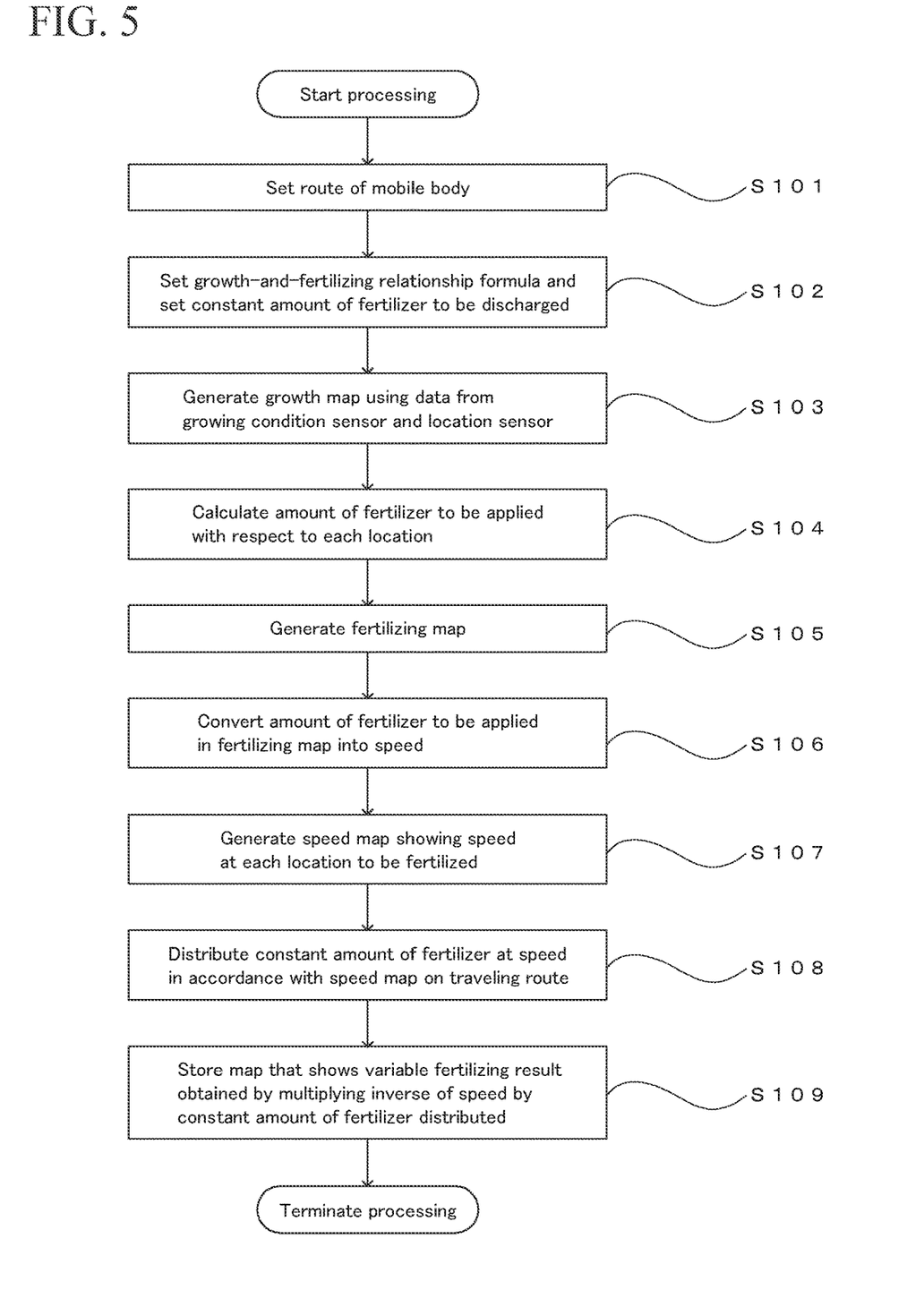
FIG. 5 is a flow chart showing an example of a processing procedure.

After the tractor 10 is moved to the field to be fertilized, the processing in FIG. 5 is performed by using the control device 100. FIG. 5 shows an example of a processing procedure performed by the control device 100. Programs for executing the processing shown in FIG. 5 are stored in the storage of the control device 100, in an appropriate storage medium, or in a server in a network, or by other means, and are provided therefrom. This also applies to the case of the flowchart in FIG. 8.

First, a traveling route of the tractor 10 in the target field is input in advance to the mobile body route receiving unit 101, and an automatic traveling system is made to be ready (step S101). Under these conditions, growth-and-fertilizing relationship parameters are determined in view of the variety of crop grown in the field to be fertilized as well as the growing environment of the crop, and the determined parameters are input to the growth-and-fertilizing relationship parameter receiving unit 102. Further, an amount per unit time of fertilizer to be discharged from the fertilizer distributing device 20, which is towed by the tractor 10, is input to the fertilizer discharging amount value receiving unit 103 (step S102).

Next, while the tractor 10 is made to automatically travel along the predetermined route, the growth condition of a target crop is measured by the growth condition sensor 11 with respect to each unit area in the field to be fertilized, whereby the growth condition before fertilizing is obtained. The unit area to be sensed by the growth condition sensor 11 can be determined by an operator as desired.

While the measurement of the growth condition of the crop is performed by the growth condition sensor 11, the identification of the sensing location Ps(x, y, z) and the fertilizer application location Pf(x, y, z) is simultaneously performed by the location identifying device 12, and the data of the growth condition and the data of the locations are correlated with each other. This result is used to generate a growth map before fertilizing, as illustrated in FIG. 2 (step S103). The generation of the growth map before fertilizing provides a map constituted of data of the growth condition of the crop at each location in the field.

Next, a target amount of the fertilizer application with respect to each location is calculated from the growth data and the growth-and-fertilizing relationship parameters with respect to the each location in the field to be fertilized (step S104), whereby a fertilizing map is obtained (step S105). The generation of the fertilizing map provides data of the amount of the fertilizer to be applied to a corresponding location in the field.

In the condition in which fertilizer is being discharged at a constant amount per unit time from the fertilizer distributing device joined to the tractor, the traveling speed of the tractor is controlled to apply the fertilizer at a target amount with respect to each unit location in the fertilizing map. For this reason, the traveling speed of the tractor is calculated so that the fertilizer will be applied at the target amount with respect to the each unit location in the fertilizing map (step S106). The traveling speed of the tractor with respect to the each unit location in the fertilizing map constitutes the speed map (step S107).

The speed map is a map of the speed of the tractor 10 at the time a sensing location Ps(x, y, z) reaches a fertilizer application location Pf(x, y, z) as the tractor 10 travels. That is, the location relationships between the locations Ps, Pgps, and Pf in FIG. 1 are preliminarily known, and the location Pgps is positioned in real time. Thus, at the stage after the sensing at the location Ps is performed, a speed at the future fertilizer application location Pf is calculated in consideration of the growth condition of the crop at the location Ps, on the basis of a distribution density of the fertilizer, which is specified in the fertilizing map. The data of the speed at the future fertilizer application location Pf constitutes the speed map.

As a result, the tractor 10 is controlled to travel at a speed corresponding to the speed map while being made to automatically travel along the input in advance fertilization-planned route, whereby the tractor 10 distributes the fertilizer at an amount corresponding to the growth condition of the target crop. (step S108). That is, the tractor 10 performs sensing at the location Ps while traveling, and after a delay time of $\Delta m$ has passed, the speed at the location Pf is adjusted in accordance with the speed map and the fertilizer is distributed to the location Pf at an amount corresponding to the growth condition of the crop, which is sensed at the location Ps.

With use of the delay time generated by a distance $\Delta m$ from the sensing location of the growth condition sensor 11 to the location to be applied with the fertilizer distributed from the fertilizer distributing device 20, the processes from steps S103 to S108 are performed by making the tractor 10 or the fertilizer distributing device 20 travel once through the field.

After fertilization, the actual traveling speed during the fertilization is extracted with respect to each unit location in the speed map. The inverse of this speed is multiplied by the amount of the fertilizer that was distributed from the tractor per unit time, to calculate an amount of the fertilizer distributed to each unit location in the field, whereby a variable fertilizing result is obtained. This result with respect to the each unit location is used to generate a map in a similar manner as in the fertilizing map and in the speed map, and the map is stored (step S109). The map of the variable fertilizing result may be fed back at the next time of fertilization to enable more effective fertilization.

Modification

In addition to the above embodiment using a mobile body that travels on a ground, such as a tractor, an embodiment using a mobile body that flies through the air is also possible.

In an embodiment illustrated in FIG. 3, processing similar to that in FIG. 5 is performed by using a device similar to that in FIG. 4.

Advantages

These embodiments enable use of a fertilizer distributing device in which the amount of fertilizer to be discharged is constant in operation by fertilizing varying the amount of fertilizer application. This fertilizer distributing device can be an already owned device or an affordable device. This enables increase in a production efficiency of the crop, at a low cost.

2. Second Embodiment

Configuration

Figure 6:
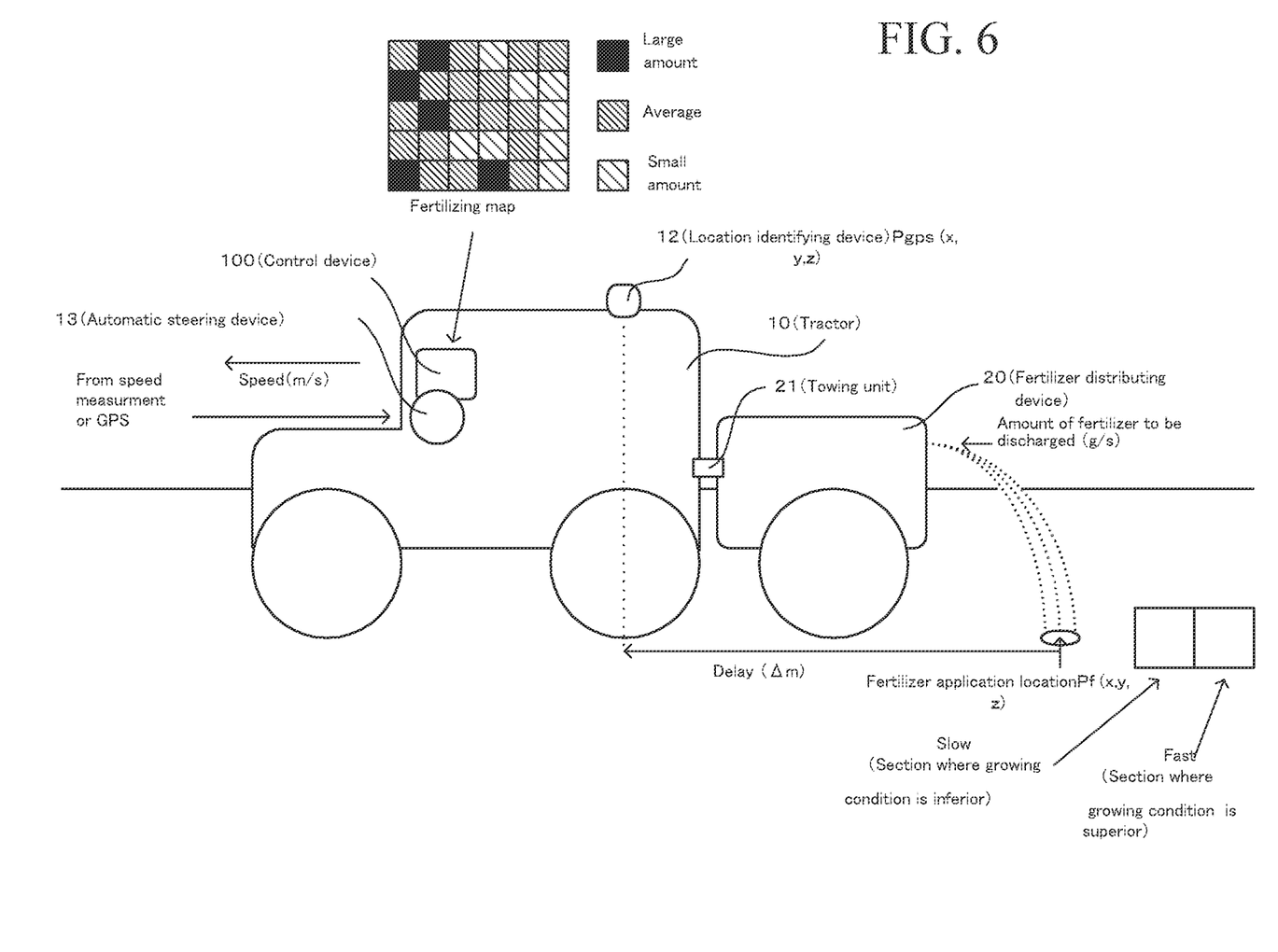
FIG. 6 is a conceptual diagram of another embodiment.
Figure 7:
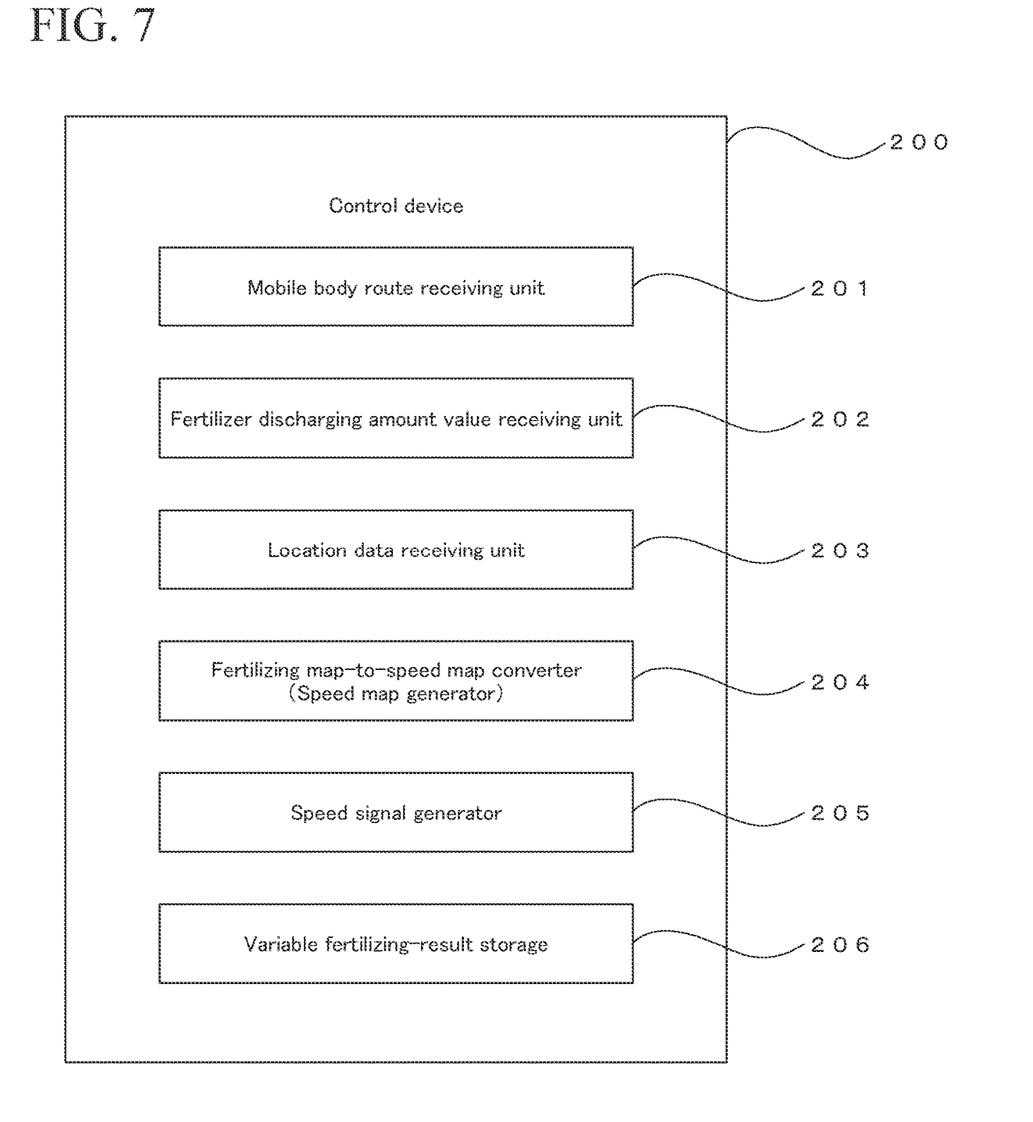
FIG. 7 is a block diagram of another control device.

FIG. 7 shows a control device 200 using the present invention. The control device 200 includes a mobile body route receiving unit 201, a fertilizer discharging amount value receiving unit 202, a location data receiving unit 203, a fertilizing map-to-speed map converter 204, a speed signal generator 205, and a variable fertilizing-result storage 206. In this embodiment, a fertilizing map is provided in advance as illustrated in FIG. 6.

The fertilizing map-to-speed map converter 204 reads a necessary amount of the fertilizer application, at each location in the field, from the fertilizing map that is obtained by means of preliminary measurement of the growth condition or by other means. Furthermore, the fertilizing map-to-speed map converter 204 calculates a traveling speed of the fertilizer distributing device from this amount of the fertilizer application. This information of the traveling speed of the mobile body at each location constitutes the speed map.

In this case, obtaining growth data is not necessary because the fertilizing map is provided in advance, and therefore, mounting a growth condition sensor to the mobile body is not necessary.

Example of Processing

The following describes an example of the processing performed by the control device 200. The control device 200 is mounted on the tractor 10 that serves as a fertilizing vehicle and is embodied as in the case in FIG. 6. In this embodiment, the fertilizer distributing device 20 is towed with a towing unit 21 of the tractor 10 and travels in a field.

Figure 8:
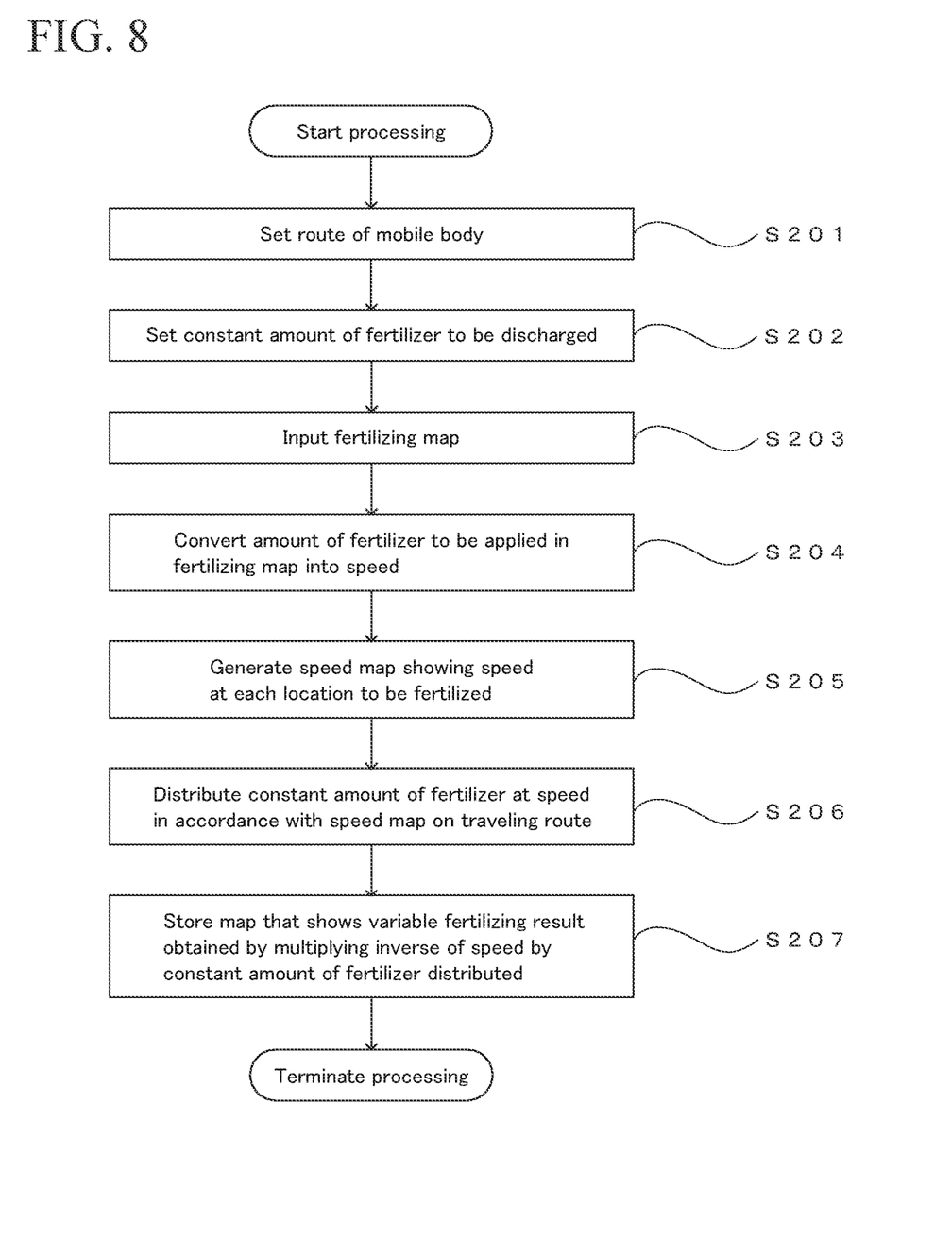
FIG. 8 is a flow chart showing another example of the processing procedure.

After the tractor 10 is moved to the field to be fertilized, the processing in FIG. 8 is performed by using the control device 200. FIG. 8 shows an example of a processing procedure performed by the control device 200.

A desired route along which the fertilizer distributing device 20 travels is input to the mobile body route receiving unit 201 (step S201). Then, an amount per unit time of fertilizer to be discharged from the fertilizer distributing device 20, which is towed by the tractor 10, is input to the fertilizer discharging amount value receiving unit 202 (step S202). Furthermore, a preliminarily obtained fertilizing map is input to the fertilizing map-to-speed map converter 204 (step S203), and the amount of the fertilizer application shown in the fertilizing map is converted into a speed (step S204), whereby a speed map is generated (step S205).

As a result, with use of the location data receiving unit 203, the tractor 10 is controlled to travel at a speed corresponding to the speed map while being made to automatically travel along the input in advance fertilization-planned route, whereby the tractor 10 distributes the fertilizer at an amount corresponding to the growth condition of the crop (step S206).

With use of a delay time generated by a distance Δm from the position of the location identifying device or of the GPS receiver to the location to be applied with the fertilizer distributed from the fertilizer distributing device 20, the processes from steps S203 to S206 are performed by making the tractor 10 or the fertilizer distributing device 20 travel once through the field.

After fertilization, the actual traveling speed during the fertilization is extracted with respect to each unit location in the speed map. The inverse of this speed is multiplied by the amount of fertilizer that was distributed from the tractor 10 per unit time, whereby a variable fertilizing result is obtained. This result with respect to the each unit location is used to generate a map in a similar manner as in the fertilizing map and in the speed map, and the map is stored (step S207). The map of the variable fertilizing result may be fed back at the next time of fertilization to enable more effective fertilization.

Modification

Figure 9:
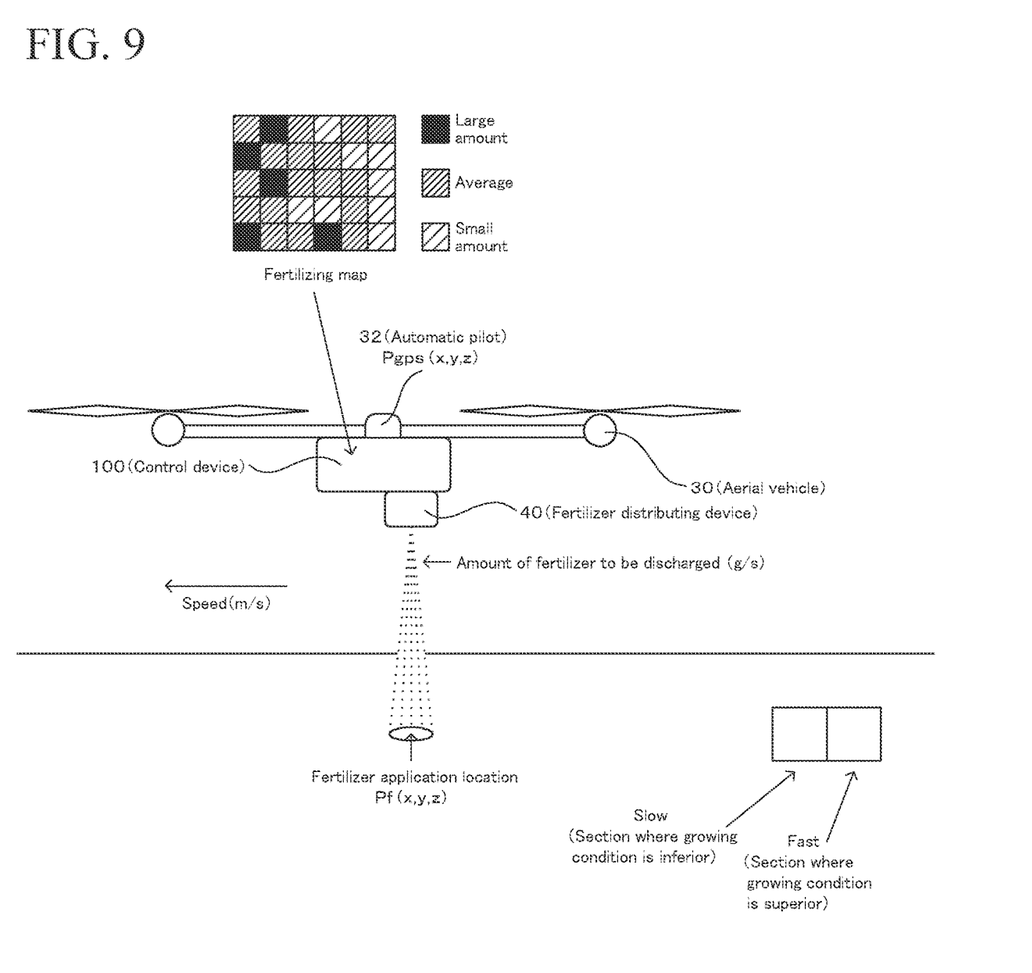
FIG. 9 is a conceptual diagram of yet another embodiment.

Similar to the case of the first embodiment, in addition to the above embodiment using a mobile body that travels on a ground, such as a tractor, an embodiment using a mobile body that flies through the air is also possible. In an embodiment illustrated in FIG. 9, processing similar to that in FIG. 8 is performed by using a device similar to that in FIG. 7.

Other Matters

In one example, a growth map may be preliminarily obtained, and a speed map may be generated by using the control device 100 on the basis of the growth map. In another example, a fertilizing map may be generated on the basis of a growth map, and a speed map is also generated on the basis of the fertilizing map, in advance, and the speed map may be input to the control device 100.

The first embodiment may have a way for an operator to steer the tractor 10. In this case, the operator performs only a steering operation, and the speed of the tractor 10 is automatically adjusted on the basis of the output from the growth condition sensor 11. That is, the accelerator of the tractor 10 is controlled by means of autonomous control in accordance with the processing of the control device 100 on the basis of the output from the growth condition sensor 11.

The present invention can be used in a mobile body with a fertilizing function.

What is claimed is:

1. An agricultural machine control device that controls a mobile body, the mobile body configured to apply fertilizer to a crop while traveling in a field,
   the mobile body including a fertilizer distributing device that distributes the fertilizer onto the field,
   the fertilizer distributing device being configured in such a manner that an amount of the fertilizer to be discharged per unit time by the fertilizer distributing device is not changed during distribution of the fertilizer,
   the device comprising a speed signal generator that generates a speed signal to cause the mobile body to travel at a speed corresponding to a planned amount of the fertilizer to be applied,
   wherein the amount of the fertilizer distributed onto the field is adjusted by adjusting the speed of the mobile body.

2. The agricultural machine control device according to claim 1, wherein the speed signal generator sets a relatively high speed for a location at which a growth condition of the crop is relatively superior and sets a relatively low speed for a location at which the growth condition of the crop is relatively inferior.

3. The agricultural machine control device according to claim 1, further comprising:
- a growth data receiving unit that receives growth data of crop at each location in the field;
- a growth map generator that generates a growth map showing a growth condition of the crop at each location in the field on a basis of the growth data;
- a fertilizing map generator that generates a fertilizing map specifying an amount of fertilizer application at each location in the field on a basis of the growth map; and
- a speed map generator that generates a speed map specifying a speed with respect to the each location in the field, on a basis of the fertilizing map.

4. The agricultural machine control device according to claim 3, wherein the growth map or the fertilizing map is obtained in advance.

5. The agricultural machine control device according to claim 1, further comprising a mobile body route receiving unit that receives a preliminarily set route,
- wherein the mobile body applies the fertilizer while automatically traveling along the preliminarily set route.

6. The agricultural machine control device according to claim 1, further comprising a variable fertilizing-result storage that stores a fertilizing result obtained from the amount of the fertilizer application and the speed of the mobile body.

7. An agricultural machine control method for controlling a mobile body, the mobile body configured to apply fertilizer to a crop while traveling in a field,
- the mobile body including a fertilizer distributing device that distributes the fertilizer onto the field,
- the fertilizer distributing device being configured in such a manner that an amount of the fertilizer to be discharged per unit time by the fertilizer distributing device is not changed during distribution of the fertilizer,
- the method comprising controlling a speed to cause the mobile body to travel at a speed corresponding to a planned amount of fertilizer to be applied,
- wherein the amount of the fertilizer distributed onto the field is adjusted by adjusting the speed of the mobile body.

8. A non-transitory computer recording medium storing computer executable instructions for controlling a mobile body that is configured to apply fertilizer to a crop while traveling in a field,
- the mobile body including a fertilizer distributing device that distributes the fertilizer onto the field,
- the fertilizer distributing device being configured in such a manner that an amount of the fertilizer to be discharged per unit time by the fertilizer distributing device is not changed during distribution of the fertilizer,
- the computer executable instructions that, when executed by a computer processor, cause the computer processor to function as a speed signal generator that generates a speed signal to cause the mobile body to travel at a speed corresponding to a planned amount of the fertilizer to be applied,
- wherein the amount of the fertilizer distributed onto the field is adjusted by adjusting the speed of the mobile body.

* * * * *